United States Patent [19]
Steinmetz

[11] Patent Number: 4,730,535
[45] Date of Patent: Mar. 15, 1988

[54] EXTENDABLE RAIL WEAPON LAUNCHER

[75] Inventor: Harold F. Steinmetz, St. Louis, Mo.

[73] Assignee: The United States of America as represented by the Secretary of the Air Force, Washington, D.C.

[21] Appl. No.: 936,678

[22] Filed: Dec. 1, 1986

[51] Int. Cl.$^4$ .............................................. F41F 5/02
[52] U.S. Cl. ................................. 89/1.54; 244/137.4
[58] Field of Search .................. 89/1.819, 1.815, 1.51, 89/1.54; 244/137 R, 118.1, 137 A, 137.3, 137.4

[56] References Cited

U.S. PATENT DOCUMENTS

| | | | |
|---|---|---|---|
| 2,409,210 | 10/1946 | Jolly | 89/1.815 |
| 2,481,542 | 9/1949 | Schuyler | 89/1.819 |
| 2,845,004 | 7/1958 | Johnson | 89/1.7 |
| 2,921,501 | 1/1960 | Parot | 244/137 A |
| 2,937,573 | 5/1960 | Gantschnigg | 89/1.51 |
| 3,008,376 | 11/1961 | Brunow et al. | 89/1.51 |
| 3,468,501 | 9/1969 | Baum | 244/137 |
| 3,624,833 | 11/1971 | Ricard | 244/118 |
| 3,771,416 | 11/1973 | Ackerman, Jr. et al. | 89/1.5 R |
| 4,008,645 | 2/1977 | Herbert | 89/1.5 R |
| 4,600,171 | 7/1986 | Kalisz | 244/137 A |

FOREIGN PATENT DOCUMENTS 2314296  9/1974  Fed. Rep. of Germany ... 244/118.1

*Primary Examiner*—Stephen C. Bentley
*Assistant Examiner*—Stephen M. Johnson
*Attorney, Agent, or Firm*—Bobby D. Scearce; Donald J. Singer

[57] ABSTRACT

An extendable and retractable weapon launch system for an aircraft is described which comprises a rack providing four point support for a launchable weapon and being movable between a stored position wherein the weapon is flush against the aircraft and an extended position wherein the weapon is deployed for launch, a pair of parallel slots defined along respective first and second sides of the rack, at least two lugs slidably received by each slot for attachment to the weapon and four point support thereof, first and second pairs of links of respective preselected lengths pivotally connecting respective forward and rearward ends of the rack to the aircraft, the respective lengths of the links selected to provide a preselected degree of inclination of the extended rack relative to the aircraft, and a hydraulic actuator for moving the rack between stored and extended positions. A spring loaded bar having along its length shape corresponding to that of the slots may be disposed near each slot to fill each slot upon removal of the lugs as upon launch of the weapon. A lug storage and attachment housing and mechanism interconnecting each lug and the weapon may be included to pivot the lug from an exposed position to a stored position upon launch of the weapon.

13 Claims, 12 Drawing Figures

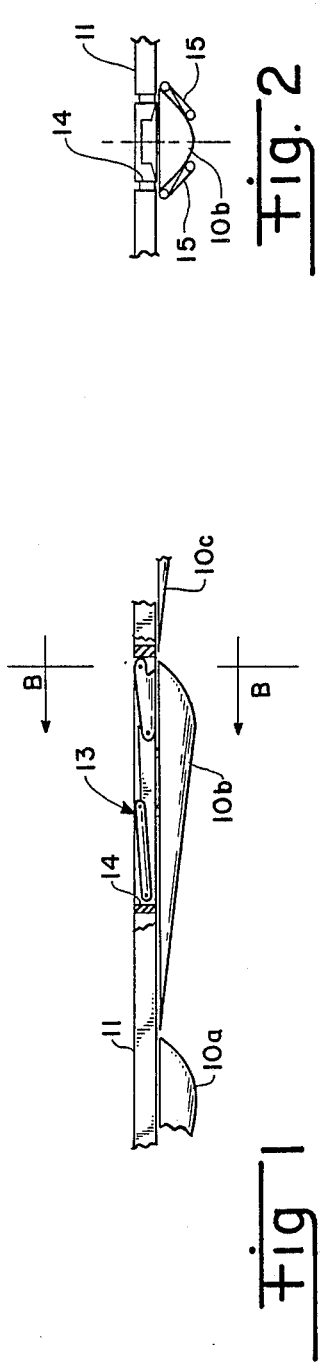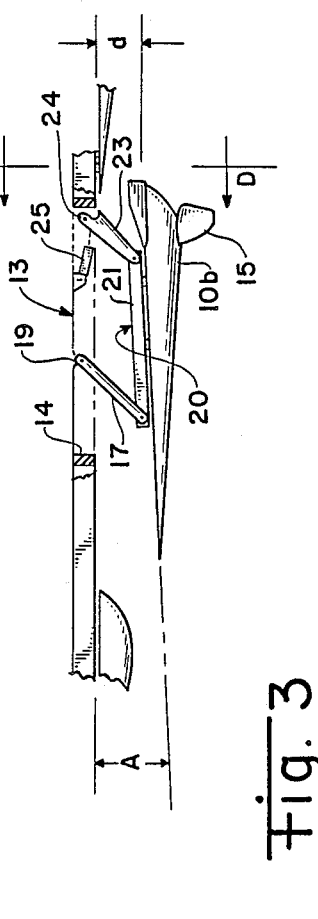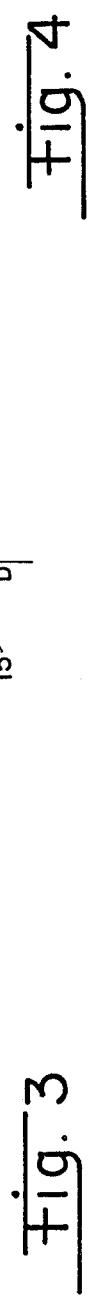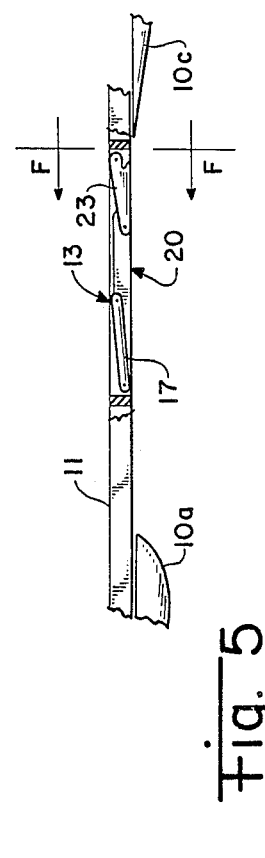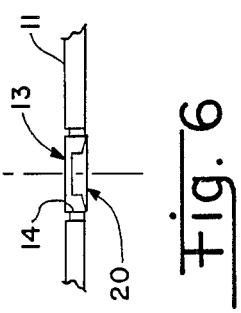

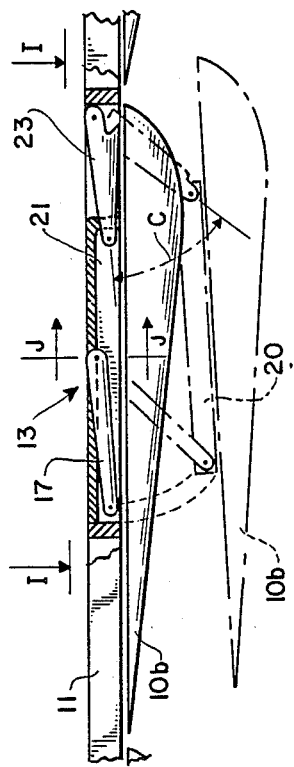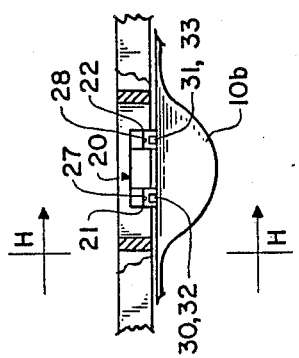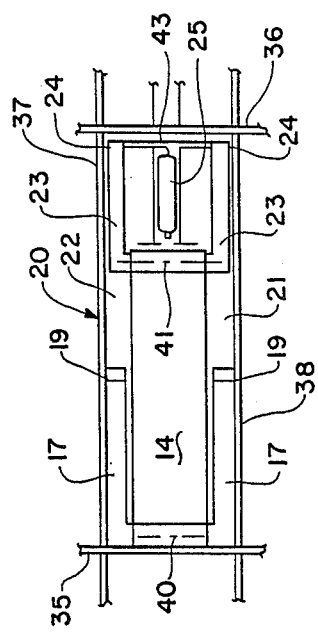

EXTENDABLE RAIL WEAPON LAUNCHER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to improvements in aircraft mounted missiles or other launchable weapons systems, and more particularly to a novel extendable rail, tangentially or flush mounted weapons launch system for aircraft.

In existing aircraft supported launchable weapons systems, a primary emphasis has been placed on streamlining weapon stores and supporting racks mounted exterior of the aircraft to maximize aerodynamic efficiency of the aircraft and to reduce drag. Existing structures configured for launching weapons from an aircraft suffer from one or more inadequacies manifest in operation at high flight dynamic pressures. Aerodynamic forces on existing flush mounted weapons tend to hold the weapon against the aircraft at launch. Ejection launch and one or two point weapon support therefore combine to allow potential contact between weapon and aircraft immediately upon launch. Existing extendable weapon launch systems generally are characterized by complex and time consuming reload or off-load procedures and functional safety checks because of obstructed access to aircraft/weapon interfaces, are susceptible to single point failure when mounted in tandem, and exhibit excessive drag in association with thin wing supersonic aircraft.

The present invention solves or substantially reduces in critical importance the problems with existing systems by providing an extendable and retractable weapon launch system for an aircraft carrying flush mounted weapons. The invention is especially suited for missiles having folded deployable fins and provides rail launch of weapons as opposed to ejection launch included in most existing systems. The invention includes a weapons rack having a pair of slotted support rails pivotally attached to the aircraft whereby the weapon can be carried flush against a surface of the aircraft, such as the underside of a wing, and extended to a launch position. A plurality of weapons may be mounted in tandem and selectively launched in any sequence. Optimum aerodynamic efficiency therefore characterizes the aircraft prior to weapon extension with favorable aerodynamic forces on the weapon at launch. A substantially flush (low drag, low observable) surface on the aircraft after weapon launch is provided at weapon attachment points with minimum space requirements in the aircraft surface for enclosing the stored extension mechanism. The invention allows rapid and efficient turn around and reload capability, and is compatible with existing rail launched weapons or with other gravity or ejection launched weapons.

It is therefore a principal object of the invention to provide an extendable rail weapon launch system for aircraft.

It is another object of the invention to provide an extendable rail launch system for tandem mounted weapons.

It is another object of the invention to provide an extendable weapon launch system for aircraft the surfaces of which are substantially clean of pylons or other appendages.

It is yet another object of the invention to provide a system for tandem mounted weapons on aircraft including selective launch of the weapons in any sequence.

These and other objects of the invention will become apparent as the description of representative embodiments proceeds.

SUMMARY OF THE INVENTION

In accordance with the foregoing principles and objects of the invention, an extendable and retractable weapon launch system for an aircraft is described which comprises a rack providing four point support for a launchable weapon and being movable between a stored position wherein the weapon is flush against the aircraft and an extended position wherein the weapon is deployed for launch, a pair of parallel slots defined along respective first and second sides of the rack, at least two lugs slidably received by each slot for attachment to the weapon and four point support thereof, first and second pairs of links of respective preselected lengths pivotally connecting respective forward and rearward ends of the rack to the aircraft, the respective lengths of the links selected to provide a preselected degree of inclination of the extended rack relative to the aircraft, and a hydraulic actuator for moving the rack between stored and extended positions. A spring loaded bar having along its length shape corresponding to that of the slots may be disposed near each slot to fill each slot upon removal of the lugs upon launch of the weapon. A lug storage and attachment housing and mechanism interconnecting each lug and the weapon may be included to pivot the lug from an exposed position to a stored position upon launch of the weapon.

DESCRIPTION OF THE DRAWINGS

The invention will be more clearly understood from the following detailed description of representative embodiments read in conjunction with the accompanying drawings wherein:

FIG. 1 is a schematic of a plurality of tangentially mounted, tandemly disposed launchable weapons attached to an aircraft wing and in the retracted position using the system of the invention;

FIG. 2 is a view of FIG. 1 along line B—B;

FIG. 3 shows the weapon arrangement of FIG. 1 with one of the weapons in the extended position according to the invention;

FIG. 4 is a view of FIG. 3 along line D—D;

FIG. 5 shows the weapon arrangement of FIG. 1 after launch of one weapon and retraction of the launch system of the invention;

FIG. 6 is a view of FIG. 5 along line F—F;

FIG. 7 is a view similar to FIG. 2 showing in partial section the aft end of a weapon and the supporting rack and rails;

FIG. 8 is view of FIG. 7 along line H—H showing a weapon in the retracted position and the extended position in phantom;

FIG. 9 is a view of FIG. 8 along line I—I;

DETAILED DESCRIPTION

Figure 10:
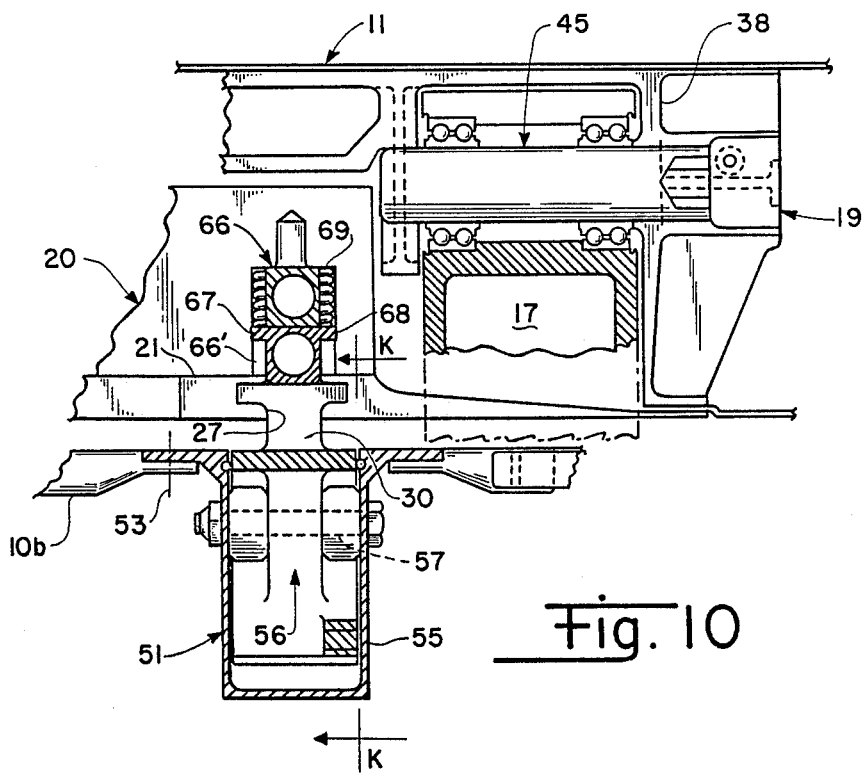
FIG. 10 is a view of FIG. 8 along line J—J.

Referring now to the drawings, FIGS. 1-6 show schematics of side and aft views of wing mounted launchable weapons according to the invention, the various views of FIGS. 1-6 being presented to provide a reference from which to fully understand and appreciate the attributes of the extendable rail weapon launch system of the invention. Accordingly, FIG. 1 presents a schematic of a plurality of tangentially mounted, tandemly disposed launchable weapons 10a, 10b,10c attached to the underside of an aircraft fuselage or wing 11 and in the retracted position against the aircraft. Each weapon is supported on wing 11 by extendable rail weapon launcher system 13 of the invention. FIG. 2 is a view of FIG. 1 along line B—B and schematically shows an aft view of one of the weapons (10b) in a retracted position against wing 11. System 13 may be disposed within a shallow recess 14 provided on the aircraft (e.g., within a wing 11 of thickness about six inches) in order to permit flush mounting of weapons 10 in the retracted position (FIGS. 1,2) with control fins 15 of weapons 10 in the folded condition. Control means for arming weapons 10 and deploying fins 15 are not shown as being outside the scope of these teachings.

Reference is now made specifically to FIGS. 3 and 4 which show respective side and aft views of weapon 10b in a deployed position. FIG. 4 is a view of FIG. 3 along line D—D. System 13 comprises a pair of forwardly disposed links 17 of preselected length pivotally mounted at one (upper) end to wing 11 (or other aircraft part) at pivotal connections 19, and through corresponding pivotal connections at the other (lower) end to the forward end of rack 20 including a pair of parallel rails 21 upon which weapon 10 is supported; a pair of rearwardly disposed links 23 of preselected length are pivotally mounted at one end to the aircraft at pivotal connections 24 and at the other end to rack 20. Any suitable extension means such as normally embodied in the form of one or more hydraulic actuators 25 operatively interconnect the aircraft and system 13 for selectively deploying weapon 10, substantially as shown in FIG. 3. Accordingly, as suggested in FIG. 3, actuator 25 may be operatively connected at one end to one or more links 17 or 23 or to rack 20 and at the other end to wing 11 within recess 14. The various component parts of system 13 are described in detail below in reference to FIGS. 7-13. Forward links 17 and rearward links 23 are selected in length (links 17 being generally of length longer than links 23) to provide extension of a weapon (viz. 10b of FIG. 3) a sufficient vertical distance d (normally about 12 inches) to clear any forwardly disposed weapon (10a), and to provide a desired preselected angle A of downward tilt of weapon 10b relative to wing 11 to prevent contact between weapon and aircraft upon weapon launch. Angle A for system 13 may preferably be selected in the range of from about 0° to 6° (nominally about 3°).

Referring now to FIG. 5, shown therein is a side view of wing 11 with weapons attached as in FIGS. 1,3 following launch of weapon 10b and retraction of system 13 previously supporting weapon 10b. FIG. 6 is a view of FIG. 5 along line F—F. As suggested in FIG. 5, upon launch of weapon 10b, system 13 is retracted within recess 14 of wing 11 leaving no appreciable external appendages to interfere with the aerodynamic efficiency of the aircraft surface. As FIG. 6 suggests, the underside of rack 20 may include a surface covering recess 14 to the maximum extent practicable consistent with the efficient operation of system 13 in the launch of a weapon 10.

Reference is now made to FIGS. 7 and 8 wherein FIG. 7 is a view similar to that of FIG. 2 showing the aft end of weapon 10b and, in partial section, rack 20 and rails 21 supporting weapon 10b. FIG. 8 is a view of FIG. 7 along line H—H showing weapon 10b in the retracted position with the extended position superimposed in phantom.

FIG. 7 illustrates an aft view of the location within rack 20 of slots 27,28 in rails 21,22 within which weapon attachment lugs 30-33 ride in the support and launch of weapons 10, as described in detail below in relation to FIGS. 10-12. FIG. 8 illustrates the appropriate degree of extension of rack 20 in deploying weapon 10b for launch. As suggested above in relation to FIG. 3, weapon 10b is extended sufficiently to clear a forwardly attached weapon (10a) upon launch, and links 17 and 23 are sized accordingly with forward links 17 being longer than rearward links 23 for attainment of a desired angle A. Further, the degree of extension of rack 20 is defined by angle C of any desired size, although forces on extended rack 20 at launch of weapon 10b may best be accommodated if rack 20 extension corresponds to an angle C of about 45°.

FIG. 9 is a view of FIG. 8 along line I—I showing a top view of system 13 (upper surface of wing 11 removed). As suggested by FIG. 9 taken with FIGS. 7 and 8, system 13 may be configured to fit within recess 14 conveniently defined between spars 35,36 and ribs 37,38 of wing 11. As best illustrated in FIG. 9, rack 20 includes a pair of beams 40,41 interconnecting the respective forward and rearward ends of rails 21,22. Torque tubes 43 interconnecting a pair of links 23 or 17 at corresponding pivot points 24 or 19 may be operatively connected to actuator 25 for deploying rack 20.

Referring now to FIG. 10, shown therein is a sectional view of system 13 along line J—J of FIG. 8 representative structure for rack, rail, pivotal link connection, and weapon attachment lug of the invention in the stored position. FIG. 10 shows only structure of one forward pivotal connection 19 of one link 17 and rail 21, although it is clear that each of the other three pivotal connections 19,24 may be similarly structured. First, link 17 may be pivotally connected to wing 11 at rib 38 through pivotal connection 19 comprising a substantially conventional bearing mount 45. As suggested above in relation to FIG. 7, rails 21,22 of rack 20 each include a T shaped slot (27 in FIG. 10) for supporting a weapon attachment lug (30 in FIG. 10). Lug 30 is T shaped and is slidably received by slot 27 in rail 21, and may be operatively attached to weapon 10b in conventional fashion. As suggested in FIG. 10, lug 30 may be operatively connected to missile 10b through lug attachment and storage mechanism 51, operatively attached to or included in the structure of missile 10b, for storage of lug 30 (FIGS. 11,12). Within the contemplation of the invention, each weapon 10 has four point support on the corresponding rack 20 and, accordingly, four lugs are operatively attached at corresponding points on weapon 10b and slidably received by slots 27,28 in rails 21,22. Lugs 30-33 and attachment mechanism 51 are carried away with the weapon upon launch. Lugs 30-33 are substantially identical, and the structure of FIGS. 10-12 is representative of the aft upper pivotal support structure for link 19 supporting rail 21 and of a mirror image of the upper pivotal structures for links 17,23 supporting rail 22.

Figure 11:
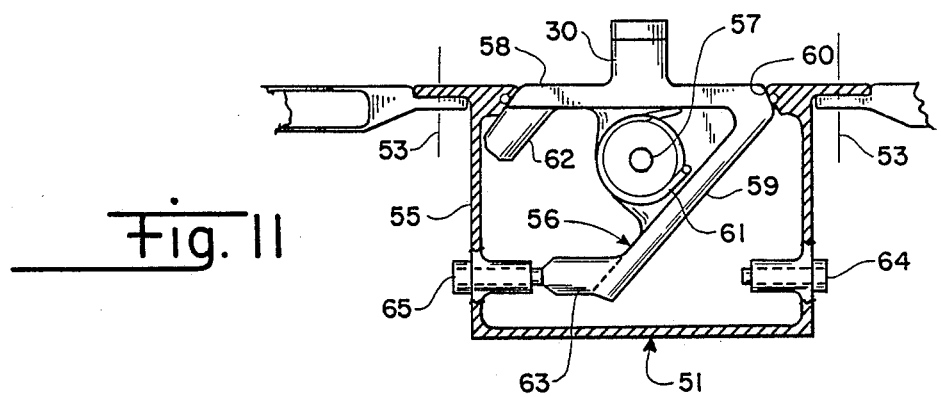
FIG. 11 is a view of FIG. 10 along line K—K showing a deployed weapon attach lug.
Figure 12:
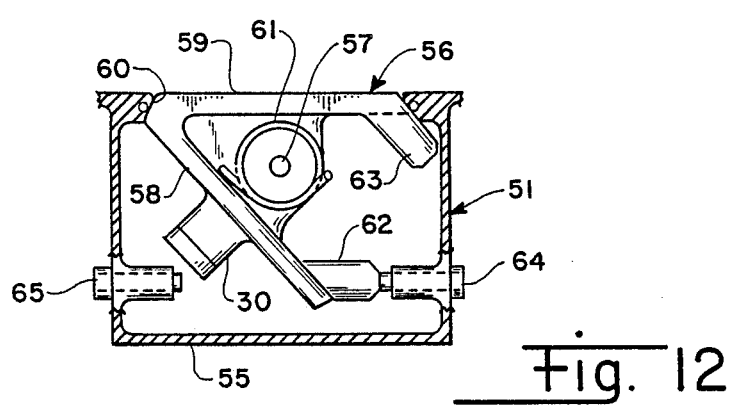
FIG. 12 is a view of the lug of FIG. 1 in the stored position.

Reference is now made to FIGS. 10–12 collectively wherein FIG. 11 is a view of FIG. 10 along line K—K showing a side view of lug 30 and supporting mechanism 51, and FIG. 12 is a view similar to that of FIG. 11 with lug 30 in a stored position. Mechanism 51 includes housing 55 attached to weapon 10b as in FIG. 10 and a pivot pin 57 for rotatably supporting lug 30. Crank 56 is pivoted on pin 57 and supports a pair of platform elements 58,59 with lug 30 defined on one of the elements (58 in FIGS. 11,12). Elements 58,59 are sized and shaped to fill opening 60 provided in housing 55 when crank 56 is rotated to the deployed position shown in FIG. 11 exposing lug 30, and to present a smooth surface flush with housing 55 when crank 56 is rotated to the stored position shown in FIG. 12. Spring 61 biases crank 56 to the stored position. Offset lugs 62,63 may be formed in or attached to elements 58,59, respectively, to abut adjustable set screws 64,65 for appropriate adjustment of elements 58,59 relative to opening 60 for each respective stored or deployed position of lug 30. It is understood that crank 56 may be shaped otherwise than as shown in FIGS. 10–12 as would occur to the skilled artisan, as to size, shape, and relative positions of platforms 58,59 which alternate shapes may obviate need for offset lugs 62,63.

Referring again specifically to FIG. 10, rack 20 may include bar 66 disposed above and parallel to each rail 21,22 at slots 27,28. Each bar 66 has length and includes shape along the lower edge 66' thereof and shoulders 67,68 along its length to close the respective slot (27 in FIG. 10) when lugs 30–33 are removed as upon launch of weapon 10b. Spring 69 is disposed between the structure of rack 20 and shoulders 67,68 to bias bar 66 into slot 27 upon removal of lugs 30–33 to present a smooth aircraft surface after weapon launch.

The invention provides a novel extendable rail weapon launch system. It is understood that modifications to the invention may be made as might occur to one with skill in the field of the invention within the scope of the appended claims. All embodiments contemplated hereunder which achieve the objects of the invention have therefore not been shown in detail. Other embodiments may be developed without departing from the spirit of the invention or from the scope of the appended claims.

I claim:

1. An extendable and retractable weapon launch system for an aircraft, comprising:
    (a) an extendable rack for providing four point support for a launchable weapon, said rack having a stored position and an extended position relative to said aircraft, said rack having forward and rearward ends and first and second sides and defining a pair of parallel slots along respective said first and second sides;
    (b) at least four lugs for attachment to a launchable weapon, said lugs sized and configured for being slidably received by said slots in said rack, two each of said lugs being received by each of said slots to provide said four point support;
    (c) a pair of spring loaded bars attached to said rack and disposed along and parallel to respective said slots, each said bar having along its length a shape corresponding to the shape of the slots, said bar biased into the corresponding slot for filling corresponding said slot upon removal of said lugs from said corresponding slot;
    (d) a pair of first links of preselected length having respective first and second ends and including means at said first ends thereof for pivotal attachment to said aircraft and means at said second ends for pivotal attachment to said forward end of said rack near respective said first and second sides thereof;
    (e) a pair of second links of preselected length shorter than that of said first links having respective first and second ends and including means at said first ends thereof for pivotal attachment to said aircraft and means at said second ends for pivotal attachment to the rearward end of said rack near respective first and second sides thereof;
    (f) wherein the respective preselected lengths of the first and second links are selected to provide a preselected degree of inclination of said rack relative to said aircraft in said extended position; and
    (g) actuating means operatively connected to said rack for selectively moving said rack between said stored position and said extended position.

2. The system as recited in claim 1 wherein said actuating means includes a hydraulic cylinder.

3. The system as recited in claim 1 wherein the respective preselected lengths of said first and second links are selected to provide forward and downward inclination of said rack relative to said aircraft of between zero degrees and six degrees.

4. The system as recited in claim 3 wherein said inclination is selected at three degrees.

5. The system as recited in claim 1 wherein each of said pair of parallel slots has a T shaped cross section, and said lugs have a corresponding T shape and are sized for being slidably received by said parallel slots.

6. An extendable and retractable weapon launch system for an aircraft, comprising:
    (a) an extendable rack for providing four point support for a launchable weapon, said rack having a stored position and an extended position relative to said aircraft, said rack having forward and rearward ends and first and second sides and defining a pair of parallel slots along respective said first and second sides;
    (b) at least four lugs for attachment to a launchable weapon, said lugs sized and configured for being slidably received by said slots in said rack, two each of said lugs being received by each of said slots to provide said four point support;
    (c) a lug storage and attachment mechanism for interconnecting each said lug and said launchable weapon, each said mechanism including:
        (i) a housing having means for attachment to said launchable weapon and defining an opening,
        (ii) a pivot pin supported within said housing,
        (iii) a crank rotatably supported on said pin and including first and second platform elements each of size and shape corresponding to said opening in said housing, said first and second platform elements disposed on said crank to selectively close said opening at respective preselected first and second pivot positions of said crank on said pin;
        (iv) said lug attached to said first platform element; and
        (v) a spring operatively disposed between said crank and said housing for biasing said crank to said second pivot position whereby said lug is exposed when said crank is pivoted to said first pivot position and is rotated to a stored position within said housing when said crank is rotated by the bias of said spring to said second pivot position;

(d) a pair of first links of preselected length having respective first and second ends and including means at said first ends thereof for pivotal attachment to said aircraft and means at said second ends for pivotal attachment to said forward end of said rack near respective said first and second sides thereof;

(e) a pair of second links of preselected length shorter than that of said first links having respective first and second ends and including means at said first ends thereof for pivotal attachment to said aircraft and means at said second ends for pivotal attachment to the rearward end of said rack near respective first and second sides thereof;

(f) wherein the respective preselected lengths of the first and second links are selected to provide a preselected degree of inclination of said rack relative to said aircraft in said extended position; and (g) actuating means operatively connected to said rack for selectively moving said rack between said stored position and said extended position.

7. The system as recited in claim 6 wherein said actuating means includes a hydraulic cylinder.

8. The system as recited in claim 6 wherein the respective preselected lengths of said first and second links are selected to provide forward and downward inclination of said rack relative to said aircraft of between zero degrees and six degrees.

9. The system as recited in claim 8 wherein said inclination is selected at three degrees.

10. The system as recited in claim 6 wherein each of said pair of parallel slots has a T shaped cross section, and said lugs have a corresponding T shape and are sized for being slidably received by said parallel slots.

11. An extendable and retractable weapon launch system for an aircraft, comprising:

(a) an extendable rack for providing four point support for a launchable weapon, said rack having a stored position and an extended position relative to said aircraft, said rack having forward and rearward ends and first and second sides and defining a pair of parallel slots of substantially T shaped cross section along respective said first and second sides;

(b) at least four lugs for attachment to a launchable weapon, said lugs sized and configured for being slidably received by said slots in said rack, two each of said lugs being received by each of said slots to provide said four point support;

(c) a pair of first links of preselected length having respective first and second ends and including means at said first ends thereof for pivotal attachment to said aircraft and means at said second ends for pivotal attachment to said forward end of said rack near respective said first and second sides thereof;

(d) a pair of second links of preselected length shorter than that of first links having respective first and second ends and including means at said first ends thereof for pivotal attachment to said aircraft and means at said second ends for pivotal attachment to said rearward end of said rack near respective first and second sides thereof;

(e) wherein the respective preselected lengths of said first and second links are selected to provide a preselected degree of inclination of said rack relative to said aircraft in said extended position;

(f) a hydraulic actuator operatively connected to said rack for selectively moving said rack between said stored and extended positions.

(g) a pair of spring loaded bars attached to said rack and disposed along and parallel to respective said slots, each said bar having along its length a shape corresponding to the shape of the slots, said bar biased into the corresponding slot for filling said slot upon removal of said lugs from the corresponding slot; and (h) a lug storage and attachment mechanism for interconnecting each said lug and said launchable weapon, each said mechanism including:

a housing having means for attachment to said launchable weapon and defining an opening, a pivot pin supported within said housing, a crank rotatably supported on said pin and including first and second platform elements each of size and shape corresponding to said opening in said housing, and first and second platform elements disposed on said crank to selectively close said opening at respective preselected first and second pivot positions of said crank on said pin;

said lug attached to said first platform element; and a spring operatively disposed between said crank and said housing for biasing said crank to said second pivot position whereby said lug is exposed when said crank is pivoted to said first pivot position and is rotated to a stored position within said housing when said crank is rotated by the bias of said spring to said second pivot position.

12. The system as recited in claim 11 wherein the respective preselected lengths of said first and second links are selected to provide forward and downward inclination of said rack relative to said aircraft of between zero degrees and six degrees.

13. The system as recited in claim 12 wherein said inclination is selected at three degrees.

* * * * *

UNITED STATES PATENT AND TRADEMARK OFFICE
CERTIFICATE OF CORRECTION

PATENT NO. : 4,730,535

DATED : March 15, 1988

INVENTOR(S) : Harold F. Steinmetz

It is certified that error appears in the above-identified patent and that said Letters Patent is hereby corrected as shown below:

```
Column 2, line 67, "FIG. 1" should be --- FIG. 11 ---.
Column 4, line 39, after "FIG. 8" should appear --- of ---.
Column 5, line 30, "includes" should be deleted.
Column 5, line 31, after "and" should appear --- includes ---.
Column 8, line 7, in claim 11(d), after "of" should appear --- said ---.
```

Signed and Sealed this

Fifth Day of July, 1988

Attest:

DONALD J. QUIGG

Attesting Officer

Commissioner of Patents and Trademarks